(12) United States Patent
Goff (10) Patent No.: US 10,954,690 B1
(45) Date of Patent: Mar. 23, 2021

(54) PIPE FENCE AND METHOD OF CONSTRUCTION

(71) Applicant: James R. Goff, Broken Arrow, OK (US)

(72) Inventor: James R. Goff, Broken Arrow, OK (US)

( * ) Notice: Subject to any disclaimer, the term of this patent is extended or adjusted under 35 U.S.C. 154(b) by 486 days.

(21) Appl. No.: 15/905,375

(22) Filed: Feb. 26, 2018

(51) Int. Cl.
*E04H 17/14* (2006.01)
*E04H 17/22* (2006.01)

(52) U.S. Cl.
CPC ......... *E04H 17/1413* (2013.01); *E04H 17/22* (2013.01); *E04H 17/1465* (2021.01)

(58) Field of Classification Search
CPC ......... E04H 17/20; E04H 17/22; E04H 17/26; E04H 17/263; E04H 17/1413; E04H 17/1417; E04H 17/1421; E04H 17/1434; E04H 2017/1413; E04H 17/1452; E04H 17/1456; E04H 17/1465; E04H 17/1469; E04H 17/1473; E04H 12/2215; E04H 2017/1452; E04H 2017/1456; E04H 2017/1465; E04H 2017/1469; E04H 2017/1473; Y10T 29/49966; Y10T 29/49968; Y10T 29/49895; Y10T 29/49899; Y10T 403/32501; Y10T 403/76; Y10T 403/471; Y10T 403/472; Y10T 403/7086; F16L 13/0245; F16B 2/14; F16B 7/04; F16B 7/0406; F16B 7/042;

(Continued)

(56) References Cited

U.S. PATENT DOCUMENTS

| 421,383 | A | * | 2/1890 | Carey et al. | .......... E04B 2/7422 |
| | | | | | 160/351 |
| 525,119 | A | * | 8/1894 | Robbins | .............. E04H 12/2215 |
| | | | | | 52/165 |

(Continued)

FOREIGN PATENT DOCUMENTS

| CN | 204703595 U | 10/2015 | |
| GB | 1155127 A | * 6/1969 | ................ F16B 2/14 |

(Continued)

OTHER PUBLICATIONS

"Good Fences Make Good Neighbors"; Priefert Fence; 2014; Brodpfence V7; US.

*Primary Examiner* — Amber R Anderson
*Assistant Examiner* — Alexus Camero
(74) *Attorney, Agent, or Firm* — Dennis D. Brown; Brown Patent Law, P.L.L.C.

(57) ABSTRACT

A metal pipe fence and method of construction in which the posts of the fence are formed of lower pipe segments, which can be driven into the ground, and upper pipe segments installed on the lower pipe segments. The upper pipe segment is temporarily retained on the lower pipe segment for welding using a wedge piece driven through an eyelet which projects from the upper pipe segment such that the wedge piece is urged into a tangential slot formed through the wall of the upper pipe segment and into gripping contact with the lower pipe segment. The rails of the fence are preferably formed by connecting lengths of metal pipe or tubing end-to-end, without welding, so that the continuous series of connected pipe or tubing segments extends through rail openings provided through the upper pipe segments of the fence posts.

15 Claims, 7 Drawing Sheets

(58) Field of Classification Search
CPC ........ F16B 7/0426; F16B 7/14; F16B 7/1463; E04G 25/08; E04G 25/066; E04F 11/1808; E04F 11/1836; E04B 2001/246; E04B 2001/2457
USPC .......... 256/65.1, 65.11, 65.12, 65.14, 65.15, 256/65.02, 70; 228/49.1, 49.3; 403/109.5, 192, 266, 267, 379.4, 409.1
See application file for complete search history.

(56) References Cited

U.S. PATENT DOCUMENTS

| | | | | |
|---|---|---|---|---|
| 666,947 | A * | 1/1901 | Ward | E04H 17/1413 256/65.11 |
| 1,725,475 | A | 8/1929 | Peterson | |
| 2,240,689 | A * | 5/1941 | Denton | E04H 17/1413 256/59 |
| 2,401,978 | A | 6/1946 | Smith | |
| 3,519,234 | A * | 7/1970 | Matson | E01F 9/685 248/156 |
| 3,921,960 | A * | 11/1975 | Bright | E04H 17/1413 256/65.12 |
| 3,993,289 | A * | 11/1976 | Lewis | E04H 17/1413 256/59 |
| 4,140,414 | A * | 2/1979 | Buttgereit | A47B 57/50 403/71 |
| 4,149,701 | A | 4/1979 | Densen | |
| 4,238,117 | A * | 12/1980 | Newman | B23K 33/006 256/65.1 |
| 4,466,600 | A | 8/1984 | Tuttle | |
| 4,477,059 | A * | 10/1984 | Willis | E04H 17/1413 256/59 |
| 4,540,160 | A * | 9/1985 | Zanavich | E04H 17/1413 256/13.1 |
| 4,763,879 | A | 8/1988 | Wasicek et al. | |
| 4,813,651 | A * | 3/1989 | Rutledge | E04H 17/1443 256/21 |
| 4,844,646 | A * | 7/1989 | Wier | F16B 2/14 403/24 |
| 4,979,724 | A | 12/1990 | Williams | |
| 5,312,089 | A * | 5/1994 | Venegas, Jr. | E04F 11/181 256/65.12 |
| 5,458,428 | A | 10/1995 | West | |
| 5,615,968 | A * | 4/1997 | Verenski | F16B 7/0426 403/312 |
| 5,803,426 | A | 9/1998 | Hart | |
| 5,857,664 | A * | 1/1999 | Schauman | E04H 12/2215 256/1 |
| 6,467,756 | B1 * | 10/2002 | Elsasser | E04H 12/2215 248/156 |
| 6,547,221 | B1 * | 4/2003 | Bork | A63C 19/10 256/65.01 |
| 6,679,481 | B2 * | 1/2004 | McNalley | E04H 17/1413 256/65.01 |
| 7,210,427 | B1 * | 5/2007 | Dillman | A01K 1/03 119/512 |
| 7,360,754 | B2 * | 4/2008 | Robbins | E04H 17/1443 256/22 |
| 7,384,024 | B2 | 6/2008 | Wink | |
| 8,336,862 | B2 * | 12/2012 | Priefert | E04H 17/1421 256/65.11 |
| 2002/0066897 | A1 * | 6/2002 | Meis | E04H 17/1413 256/65.1 |
| 2003/0159839 | A1 * | 8/2003 | Perko | E02D 5/56 172/100 |
| 2011/0001104 | A1 * | 1/2011 | Rowley | E04H 17/143 256/65.03 |
| 2013/0175422 | A1 * | 7/2013 | Clarke | E04H 12/2261 248/523 |
| 2013/0263532 | A1 * | 10/2013 | Dabkowski | E04H 12/2284 52/165 |
| 2014/0076243 | A1 * | 3/2014 | Barzani | A01K 15/027 119/416 |

FOREIGN PATENT DOCUMENTS

| | | | | |
|---|---|---|---|---|
| GB | 1475310 | A * | 6/1977 | E04G 7/301 |
| GB | 1495711 | A * | 12/1977 | E04G 25/00 |
| JP | 11210271 | A | 8/1999 | |

* cited by examiner

PIPE FENCE AND METHOD OF CONSTRUCTION

FIELD OF THE INVENTION

The present invention relates to fences which are formed of metal pipe and/or metal tubing. The invention also relates to systems and methods for assembling and constructing such fences.

BACKGROUND OF THE INVENTION

Metal pipe fences are commonly constructed for use as livestock fences, corrals, livestock pens, property boundary fences for homes and estates, and for other purposes. Such fences comprise a series of vertical fence posts having rails extending therebetween wherein the posts of the fence are typically formed of segments of metal pipe and the fence rails are formed of smaller diameter lengths of metal pipe or tubing.

The traditional technique for constructing metal pipe fences has involved (a) drilling holes in the ground at appropriate locations and intervals for the metal pipe posts, (b) installing the metal pipe posts in the holes, (c) coping the ends of the metal pipe or tubing rail segments so that the shape of the coped ends of the rails corresponds to the cross-sectional size and circular radius of the metal pipe posts, (d) welding the coped ends of the pipe or tubing rail segments to the metal pipe posts, and (e) painting the metal pipe fence to provide a finished appearance and to protect the fence from rust and deterioration.

Unfortunately, traditional metal pipe fences, as well as the traditional methods of constructing such fences, have many shortcomings and disadvantages. Such shortcomings and disadvantages include, but are not limited to: (a) the need to drill holes in the ground for the metal pipe posts, (b) the need to precisely locate and space the post holes and the metal pipe posts to correspond to the length of the rail segments, (c) the time and cost required to cope the ends of the rail segments, (d) the amount of welding required to attach the ends of the pipe or tubing rail segments to the metal pipe posts and the difficulty of the attachment procedure, (e) the difficulty of correcting any errors in the location, spacing, or vertical alignment of the metal pipe posts, (f) the necessity of using untreated pipe and/or untreated tubing segments for the construction process due to the extensive amount of welding required, (g) the time and cost required to paint the fence after construction, and (h) the lack of sufficient protection provided by paints or similarly applied materials against rust and corrosion.

Consequently, a need exists for an improved metal pipe fence and method of construction wherein: (1) it is not necessary to drill holes in the ground in order to install the metal pipe posts, (2) the method of installing the metal pipe posts provides a more reliable and consistent means of ensuring that the posts are properly located, spaced, and vertically aligned, (3) any errors in the placement or alignment of the metal pipe posts are much easier to correct, (4) there is a significantly greater margin for error in the spacing and alignment of the metal pipe posts, (5) the installation of the metal pipe or tubing rails between the posts is much easier and quicker, (6) the fence can be constructed with significantly less welding, (7) it is not necessary to cope the ends of the rails segments, (8) no welding of the rails to the posts is required, and (9) some or all of the metal pipe and/or metal tubing components of the fence can be pretreated by powder coating or other techniques prior to delivery to the construction site in order to provide a better appearance, eliminate or reduce painting requirements, and provide greater protection against rust and corrosion.

SUMMARY OF THE INVENTION

The present invention satisfies the needs and alleviates the problems discussed above.

In one aspect, there is provided a fence which preferably comprises: (a) a plurality of upwardly extending lower post segments formed of metal pipe, the lower post segments having upper end portions; (b) a plurality of upwardly extending upper post segments formed of metal pipe, the upper post segments having lower end portions and the lower end portions having side walls; (c) the upper end portions of the lower post segments being received in the lower end portions of the upper post segments; and (d) the lower end portions of the upper post segments having one or more welding openings provided through the side walls of the lower end portions for welding the lower end portions of the upper post segments to the upper end portions of the lower post segments.

In another aspect, the inventive fence can additionally or alternatively comprise a connected series of lengths of metal pipe or metal tubing wherein (a) the connected series of the lengths of metal pipe or metal tubing extends continuously through rail openings formed through a series of the upper post segments and (b) the lengths of pipe or tubing are preferably connected together without welding.

In another aspect, there is provided a fence post for a metal pipe fence. The fence post preferably comprises: (a) a lower post segment formed from a section of metal pipe; (b) an upper post segment formed from a section of metal pipe; (c) the lower post segment having an upper end portion which is receivable in a lower end portion of the upper post segment; (d) a slot opening (preferably a tangentially extending slot opening) provided through a side wall of the lower end portion of the upper post segment; and (e) an eyelet structure projecting from the lower end portion of the upper post segment. The eyelet structure is positioned over the slot opening of the lower end portion of the upper post segment and the eyelet structure has an opening therethrough which is positioned over and is in communication with the slot opening.

In another aspect, the inventive fence post can additionally or alternatively comprise: (i) one or more fence rail openings provided through a side wall of the upper post segment above the lower end portion of the upper post segment and (ii) each of the fence rail openings having a rail wedge slot, provided in the side wall of the upper post segment, which extends from and is in communication with the fence rail opening for receiving a wedge piece for locking a rail in fixed position in the fence rail opening.

In another aspect, there is provided a method of constructing a fence which preferably comprises the steps of: (a) driving a series of lower post segments into the ground, the lower post segments being formed of metal pipe and the lower post segments having upper end portions and (b) placing upper post segments on the lower post segments such that the upper end portions of the lower post segments are received in lower end portions of the upper post segments. The upper post segments are formed of metal pipe and each of the upper post segments preferably comprises: (i) a tangentially extending slot opening provided through the side wall of the lower end portion of the upper post segment and (ii) an eyelet structure projecting from the lower end portion of the upper post segment. The eyelet structure is positioned over the tangentially extending slot opening of the lower end portion of the upper post segment and the eyelet structure has an opening therethrough which is positioned over and is in communication with the tangentially extending slot opening.

The method preferably further comprises the steps of (c) inserting wedge pieces into the openings of the eyelet structures of the upper post segments such that the wedge pieces are urged into the tangentially extending slot openings of the lower end portions of the upper post segments and against the upper end portions of the lower post segments to at least temporarily lock the lower end portions of the upper post segments on the upper end portions of the lower post segments and then (d) welding the lower end portions of the upper post segments to the upper end portions of the lower post segments. The lower end portions of the upper post segments are preferably welded to the upper end portions of the lower post segments through one or more welding openings provided through the side walls of the lower end portions of the upper post segments. The wedge pieces can be removed from the openings of the eyelet structures after step (d).

In another aspect, the inventive method of constructing a fence can alternatively or additionally comprise the steps of (i) extending lengths of metal pipe or metal tubing through rail openings provided through the upper post segments above the lower end portions of the upper post segments and (ii) before, during, and/or after the step of extending, connecting the lengths of metal pipe or metal tubing together to form a connected series of the lengths of metal pipe or metal tubing, preferably without welding.

In another aspect, by providing wedge slots in the upper post segments which are in communication with the rail openings, the method also preferably comprises the step of inserting wedge pieces into the wedge slots such that the wedge pieces are urged against the connected series of the lengths of metal pipe or metal tubing to lock the connected series of the lengths of metal pipe or metal tubing in fixed position in the rail openings.

Although the connected series of metal pipe or tubing segments can optionally also be welded in the rail openings of the upper post segments, the wedge pieces will preferably be used to secure the connected series of metal pipe or tubing segments in the upper post segments without welding. Consequently, the lengths of metal pipe or metal tubing used to form the rails of the inventive fence can be pre-treated, e.g., by powder coating, prior to delivery to the construction site, thus providing a more attractive finish and/or better protection against rust and corrosion, in addition to further reducing the cost of the inventive fence.

Further objects, features, advantages and benefits of the present invention will be apparent to those in the art upon examining the accompanying drawings and upon reading the following Detailed Description of the Preferred Embodiments.

DETAILED DESCRIPTION OF THE PREFERRED EMBODIMENTS

An embodiment 2 of the metal pipe fence provided by the present invention is illustrated in FIGS. 1-14. The inventive pipe fence 2 comprises (a) a series of vertical posts 4 and (b) one or more (typically a plurality of vertically spaced) rails 5 formed of metal pipe or metal tubing which extend between and/or through the vertical posts 4. Each vertical post 4 of the inventive fence 2 preferably comprises (i) a lower post segment 6, formed of metal pipe, which is installed in the ground 7 and (ii) an upper post segment 8, also formed of metal pipe, having a lower end portion 10 which is installed over or in the upper end portion 12 of the lower post segment 6.

Although the lower post segments 6 of the inventive fence 2 can optionally be installed in holes which have been drilled into the ground 7, the lower post segments 6 will more preferably be driven into the ground 7 using, e.g., a tractor mounted hydraulic post driver or similar system. The lower post segments 6 will preferably be formed of segments of metal pipe which have an outside diameter in the range of from about 2.5 to about 6 inches (more preferably from about 3.5 to about 4.5 inches and most preferably about 4 inches) and a height in the range of from about 36 to about 48 inches (more preferably from about 40 to 45 inches). The lower post segments 6 will preferably be driven from about 31 to about 43 inches (more preferably from about 33 to about 39 inches) into the ground 7.

The inside diameter of the upper post segments 8 will preferably be larger than the outside diameter of the lower post segments 6 so that the lower end portions 10 of the upper post segments 8 can be installed over the upper end portions 12 of the lower post segments 6. The upper post segments 8 will preferably be formed of segments of metal pipe which have an outside diameter in the range of from about 3 to about 6.5 inches (more preferably from about 4 to about 5 inches and most preferably about 4.5 inches) and a height in the range of from about 48 to about 72 inches (more preferably from about 50 to about 66 inches). The lower end portions 10 of the upper post segments 8 can be installed over the upper end portions 12 of the lower post segments 6 such that the bottom ends of the upper post segments 8 can be at, below or above ground level.

The amount of overlap between the lower end portions 10 of the upper post segments 8 and the upper end portions 12 of the lower post segments 6 will preferably be in the range of from about 6 to about 12 inches and will more preferably be from about 7 to about 10 inches. When installing the inventive fence 2, the amount of overlap between the lower end portion 10 of the upper post segment 8 and the upper end portion 12 of the lower post segment 6 can be adjusted as needed for each individual post 4 to provide the correct individual, above-ground, vertical height for the post 4.

An example of an upper post segment 8 preferred for use in the inventive metal pipe fence 2 is illustrated in FIGS. 7-12. The upper post segment 8 comprises a plurality of slots formed through, and spaced around, the side wall 11 of the lower end portion 10 of the upper post segment 8. These slots include (a) a t-shaped slot 14 for installing a wedge eyelet piece 15 (discussed below) and (b) one or more, preferably three, plug welding slots 16 which provide small openings for plug welding the lower end portion 10 of the upper post segment 8 to the upper end portion 12 of the lower post segment 6.

The t-shaped slot 14 preferably includes (a) an elongate tangential portion 18 which extends tangentially cross the lower end portion 10 of the upper post segment 8 and (b) a shorter lateral portion 20 which extends perpendicularly across the center of the elongate tangential portion 18 of the t-shaped slot 14. The lateral portion 20 forms tab openings 20a and 20b above and below the center of the elongate tangential portion 18 for attachment of the wedge eyelet piece 15.

Figure 13:
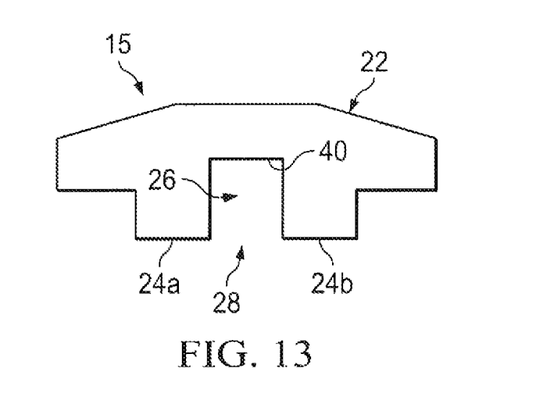
FIG. 13 is an elevational side view of a wedge eyelet piece 15 used on the upper post segment 8.

The wedge eyelet piece 15 comprises: an eyelet body structure 22; a pair of attachment tabs 24a and 24b which project from the body structure 22; and an eyelet slot opening 26 which has an open base end 28 and is formed in the eyelet body structure 22 between the projecting attachment tabs 24a and 24b.

When attaching the wedge eyelet piece 15 to the lower end portion 10 of the upper post segment 8, the projecting attachment tabs 24a and 24b of the wedge eyelet piece 15 are inserted into the upper and lower tab openings 20a and 20b of the t-shaped slot 14 such that (a) the wedge eyelet piece 15 extends laterally with respect to the elongate tangential portion 18 of the t-shaped slot 14 and (b) the open base 28 of the eyelet slot opening 26 is positioned over, and in communication with, the center of the elongate tangential portion 18 of the t-shaped slot 14. Next, after inserting the attachment tabs 24a and 24b of the wedge eyelet piece 15 into the tab openings 20a and 20b of the t-shaped slot 14, the wedge eyelet piece 15 is preferably welded to the upper post segment 8 over the t-shaped slot 14. The wedge eyelet pieces 15 will preferably be attached to the lower end portions 10 of the upper post segments 8 in this manner prior to delivering the upper post segments 8 to the fence construction site.

In the method of the present invention for constructing all or a section of the inventive fence 2, the vertical posts 4 of the section of the inventive fence 2 under construction will preferably be installed by (a) driving the lower post segments 6 of the posts 4 into the ground 7 to a desired depth at the desired locations and intervals for the posts 4, (b) lowering the lower end portions 10 of the upper post segments 8 of the posts 4 onto the upper end portions 12 of the lower post segments 6; (c) forming and installing the one or more continuous rails 5 of the inventive fence 2 using an inventive rail installation procedure, discussed below, such that the one or more continuous rails 5 extend through or into each of the upper post segments 8 of the fence 2 as needed; (d) vertically adjusting the upper post segment 8 of each fence post 4 to the final height desired for the post 4 and driving a wedge post 30, e.g., of the type illustrated in FIG. 3, through the eyelet slot opening 26 of the wedge eyelet piece 15 on the lower end portion 10 of the upper pipe segment 8 such that the wedge post 30 operates to temporarily hold the upper post segment 8 on the lower pipe segment 6 at the desired vertical height; (e) plug welding the lower end portions 10 of the upper post segments 8 to the upper end portions 12 of the lower post segments 6 in the plug welding slot(s) 16 provided through the lower end portions 10 of the upper post segments 8; (f) removing the wedge posts 30 from the wedge eyelet pieces 15, e.g., by hammering or otherwise driving the wedge post 30 in the opposite direction; and (g) optionally making additional plug welds between the lower end portions 10 of the upper post segments 8 and the upper end portions 12 of the lower post segments 6 through the elongate tangential portions 18 of the t-shaped slots 14.

Figure 1:
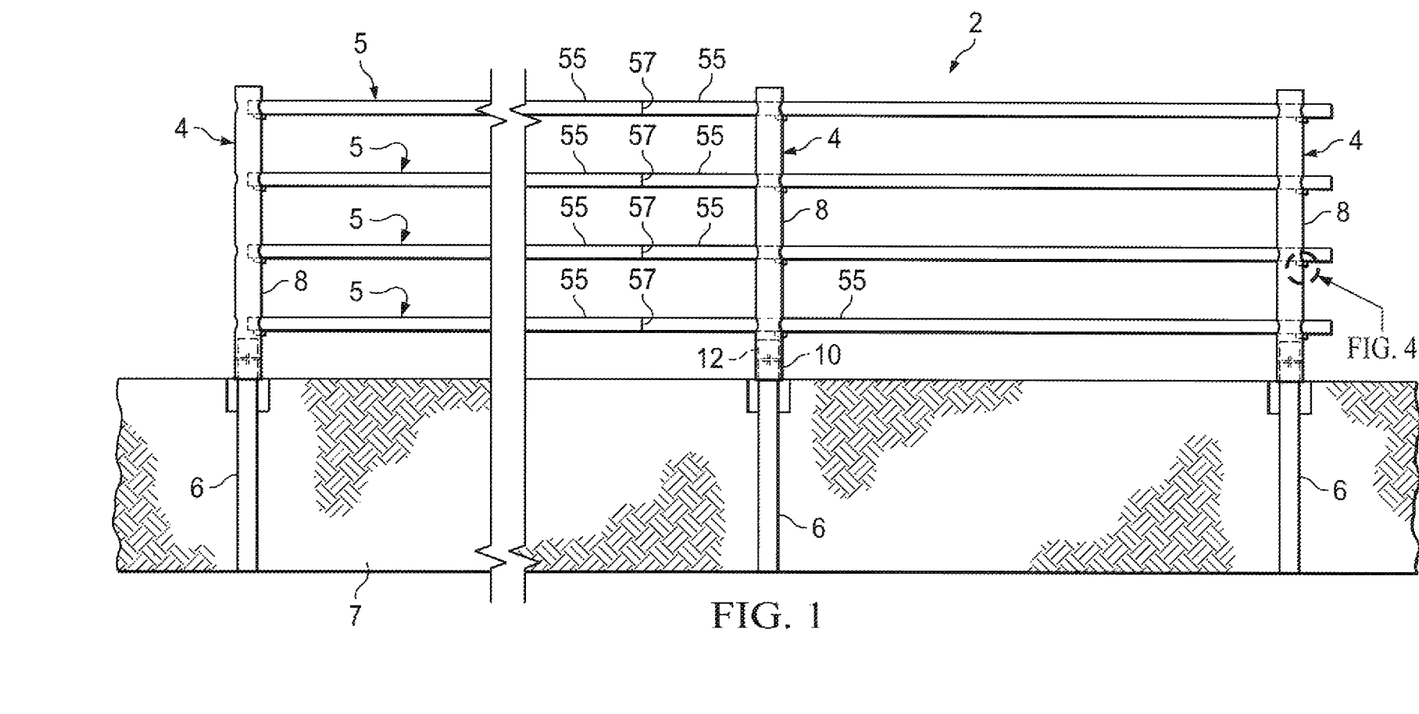
FIG. 1 is an elevational front view of an embodiment 2 of a section of the metal pipe fence provided by the present invention.
Figure 2:
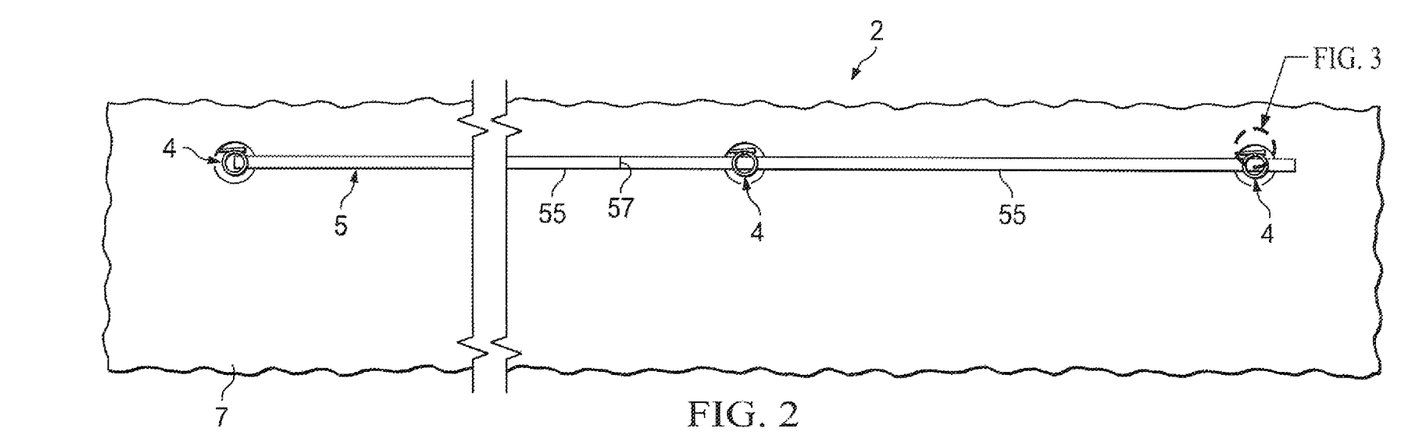
FIG. 2 is a plan view of the inventive metal pipe fence 2.
Figure 3:
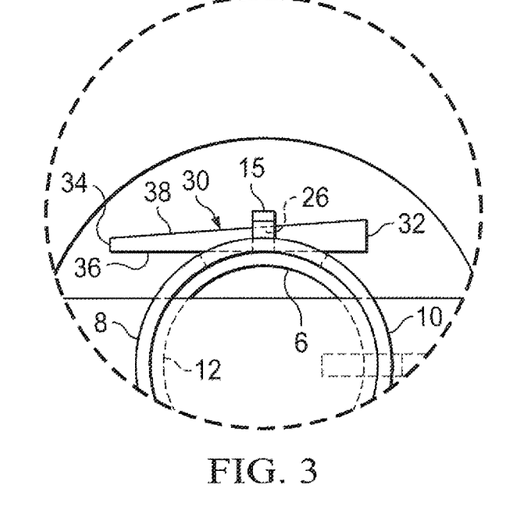
FIG. 3 is an enlarged view of Detail B shown in FIG. 2.

The wedge post 30 used in the inventive method for constructing the pipe fence 2 is preferably an elongate wedge-shaped piece having a lateral width which is narrower than the eyelet slot opening 26 of the wedge eyelet piece 15 and is also narrower than the tangential portion 18 of the t-shaped slot 14 beneath the eyelet slot opening 26. The wedge post 30 has a rearward ("driving") end 32 and an opposite forward end 34 having a height which is less than the height of the driving end 32 so that the forward end 34 can be inserted into and driven through the eyelet slot opening 26 of the wedge eyelet piece 15. The wedge post 30 further comprises an elongate straight edge 36 which extends from the driving end 32 to the forward end 34 and an angled opposite edge 38 which diverges outwardly as it extends from the forward end 34 to the driving end 32 such that, as the forward end 34 of the wedge post is driven through the eyelet slot opening 26, the resulting contact which occurs between the top interior edge 40 of the eyelet slot opening 26 and the angled opposite edge 38 of the wedge post 30 urges the elongate straight edge 36 of the wedge post 30 into the tangential portion 18 of the t-shaped slot 14 and into binding contact with the exterior of the upper end portion 12 of the lower post segment 6.

Figure 7:
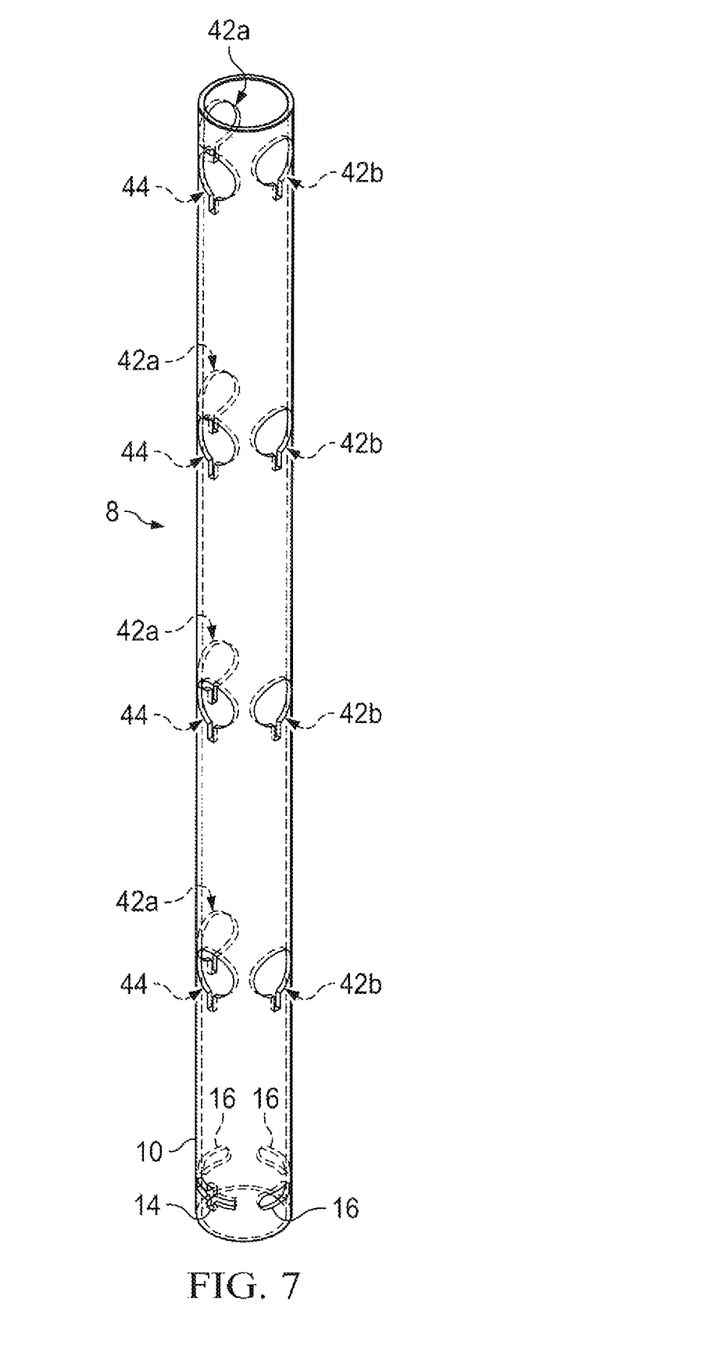
FIG. 7 is a perspective view of an upper post segment 8 of a metal pipe fence post 4 provided by the present invention.
Figure 8:
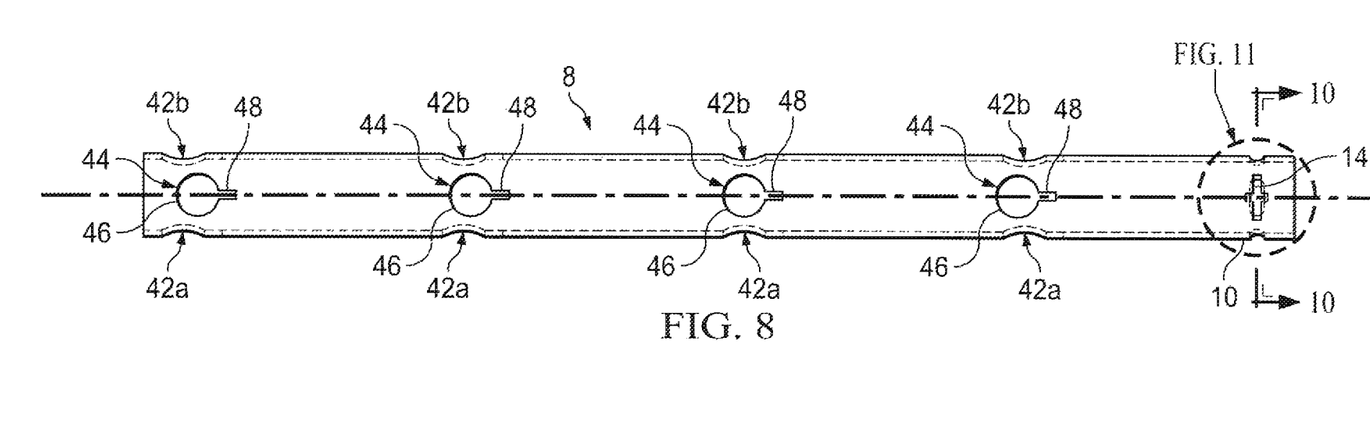
FIG. 8 is a side view of the upper post segment 8.
Figure 9:
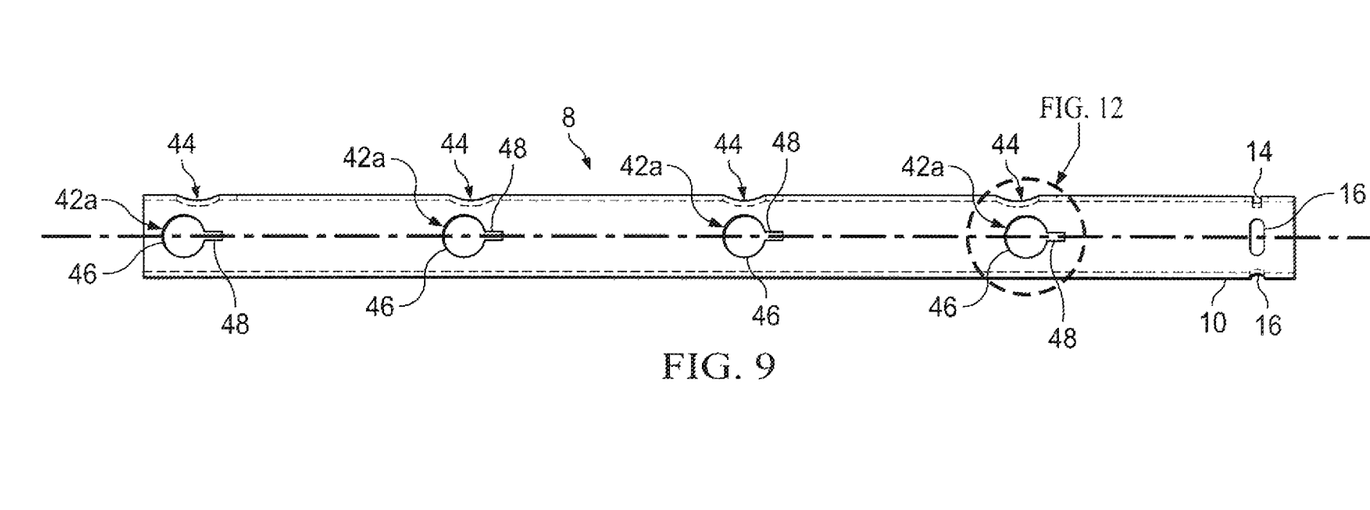
FIG. 9 is a side view of the upper post segment 8 rotated 90°.
Figure 10:
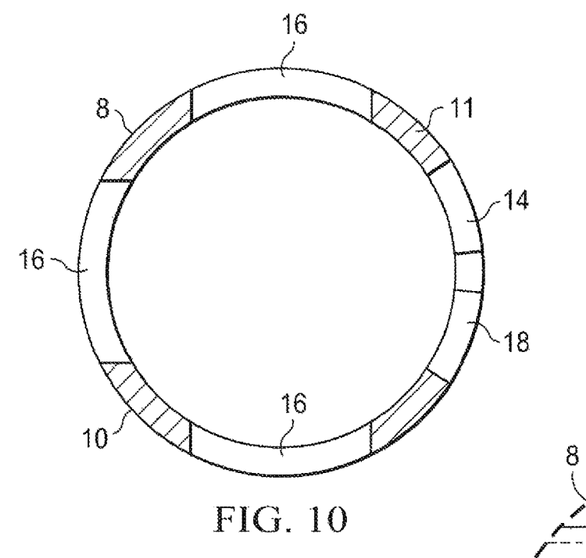
FIG. 10 is a cutaway cross-sectional view of the upper post segment 8 as seen from perspective A-A shown in FIG. 8.
Figure 11:
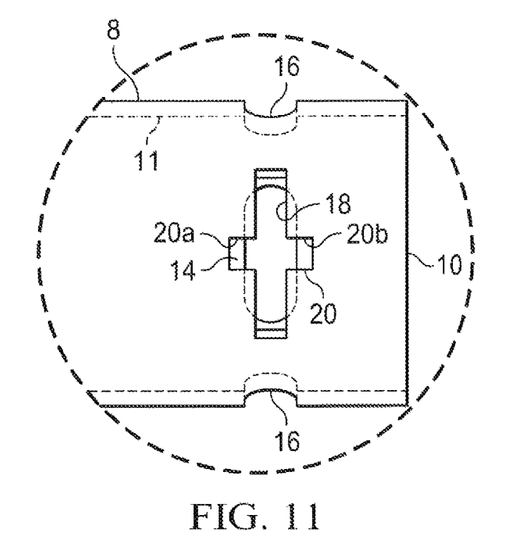
FIG. 11 is an enlarged view of Detail D shown in FIG. 8.
Figure 12:
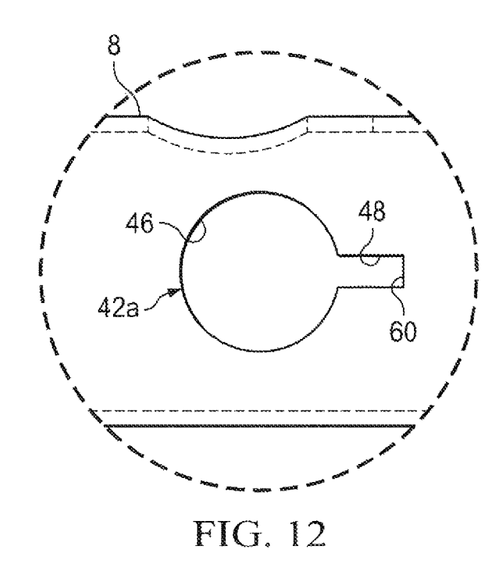
FIG. 12 is an enlarged view of Detail C shown in FIG. 9.

By way of example, but not by way of limitation, and depending upon the number of rails 5 which will extend between the vertical fence posts 4 of the inventive fence 2, and also depending upon whether the post 4 will be used as an intermediate post or an end or corner post, the upper post segment 8 of each fence post 4 can include either: (a) a pair of aligned rail cutout openings 42a and 42b, for each rail 5, which extend through opposite lateral sides of the upper pipe segment 8; (b) a single rail cutout opening 44, for each rail 5, which extends through just one side of the upper pipe segment 8; (c) both (a) and (b) as illustrated in FIGS. 7-9 to allow the post 4 to be used as either or both an intermediate post and/or an end post; (d) a pair of rail cutout openings 42a and 42b on opposite sides of the upper pipe segment 8 which are located at somewhat different heights; or (e) a pair of non-aligned cutouts which are oriented with respect to each other at an angle which is less than 180°.

Each rail cutout 42a, 42b, and/or 44 of the upper post segment 8 preferably has a keyhole shape which comprises an upper circular opening 46 and a rectangular wedge slot 48 which extends downwardly from the bottom of the circular opening 46. The diameter of the circular opening 46 will preferably be slightly greater than the outside diameter of the rail(s) 5 so that the rail(s) 5 can be inserted into and/or through the rail cutout(s) 42a, 42b, and/or 44. The rectangular wedge slots 48 which extend downwardly from the circular openings 46 of the cutouts 42a, 42b, and 44 are provided for insertion of a rail wedge 50 (discussed below) for securing and stabilizing the rail segments 5 in the fence posts 4, preferably without welding.

As noted above, the inventive fence 2 and the inventive method of constructing the fence 2 allow the one or more continuous rails 5 of the fence 2 to be formed and extended through or into the fence posts 4 before setting the vertical position of the upper post segment 8 and permanently welding the upper post segment 8 in place on the lower post segment 6. The ability to make such adjustments after the one or more rails 5 are in place ensures that the vertical height and angular orientation of each post 4 will be correct.

In the rail installation procedure used in the inventive method for constructing the inventive fence 2, each of the one, two, three, or more rails 5 of the inventive fence 2 is preferably formed and installed by (a) extending lengths 55 of smaller diameter metal pipe or metal tubing through the aligned rail cutouts 42a and 42b provided for the rail 5 through the intermediate vertical posts 4 of the inventive fence 2, (b) inserting the terminal ends of the end pieces of the rail 5 into the cutouts 44 provided for the rail 5 in the corner or end posts 4 of the inventive fence 2, (c) connecting the ends of the lengths 55 of pipe or tubing for the rail 5 together, end-to-end, preferably without welding, such that the rail 5 preferably comprises a continuous series of connected lengths 55 of metal pipe or metal tubing, (d) adjusting and setting the vertical heights of the upper post segments 8 of the fence posts 4 and welding the upper post segments 8 in place on the lower post segments 6 as discussed above, and (e) driving a rail wedge 50 into the wedge slot 48 of each cutout 42a, 42b, and/or 44 beneath the rail 5 in each post 4 to stabilize and lock the rail 5 in fixed position, preferably without welding.

Figure 14:
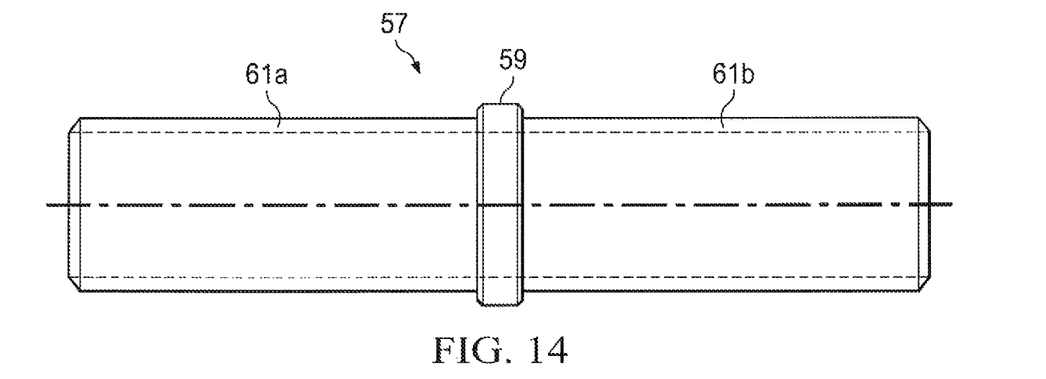
FIG. 14 is an elevational side view of a rail segment pin joint 57 used in the inventive fence 2.

The ends of the lengths 55 of metal pipe or metal tubing used for forming each continuous rail 5 are preferably joined together, without welding, using a pin joint 57 of the type illustrated in FIG. 14. The pin joint 57 comprises: a center ring 59 which is formed around the middle of the pin joint 57 and preferably has an outside diameter which is the same as or close to the outside diameter of the pipe or tubing segments 55; a first, smaller diameter pin segment 61a which projects from one side of the center ring 59 and is received in the end of one of the lengths 55 or pipe or tubing; and a second pin segment 61b which projects from the opposite side of the center ring 59 and is received in the next succeeding length 55 of pipe or tubing used for forming the rail 5.

Alternatively, the lengths 55 of pipe or tubing forming the continuous rail 55 can, for example, be connected together, without welding, by using a swagger tool or machine to reduce the outside diameter of one end of each of the lengths 55 of metal pipe or tubing so that the reduced end can then be inserted directly into the non-reduced end of the next succeeding length 55 of pipe or tubing.

Figure 4:
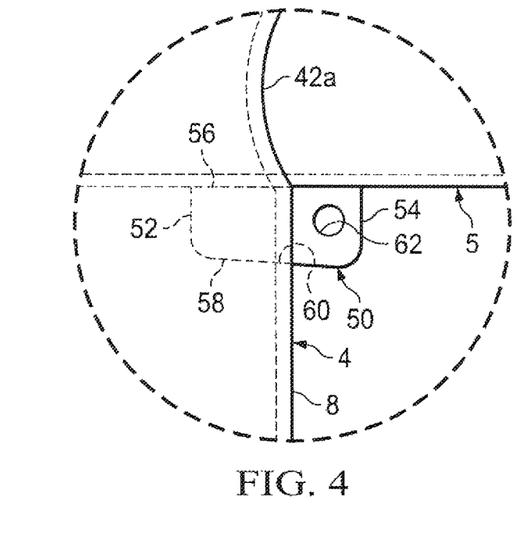
FIG. 4 is an enlarged view of Detail C shown in FIG. 1.
Figure 5:
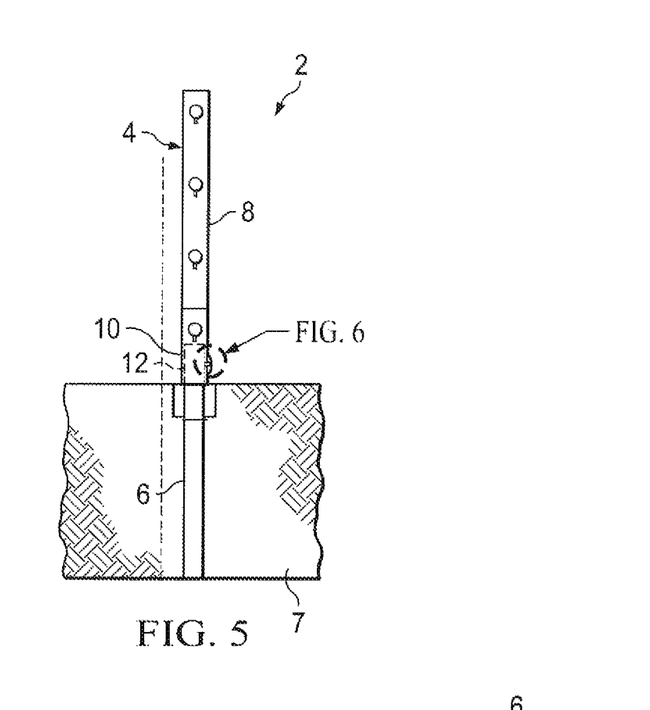
FIG. 5 is an elevational end view of the inventive metal pipe fence 2.
Figure 6:
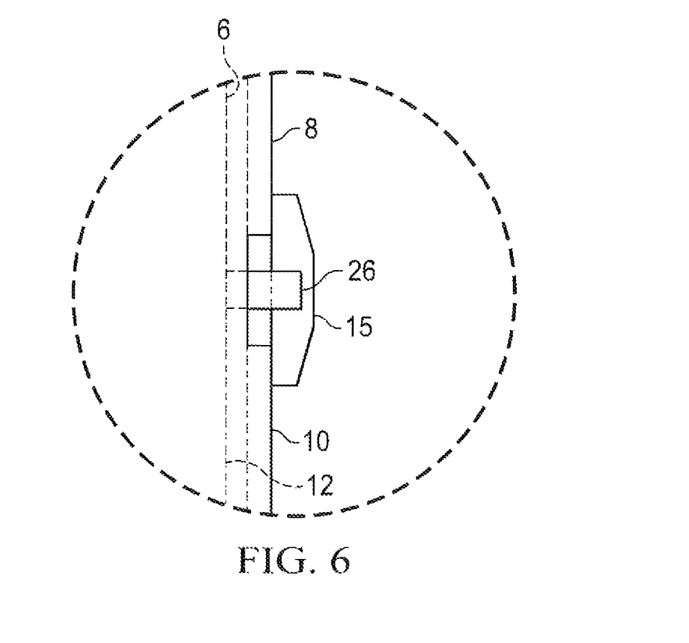
FIG. 6 is an enlarged view of Detail A shown in FIG. 5.

As illustrated in FIG. 4, the rail wedge 50 used in the inventive construction method for constructing the pipe fence 2 preferably comprises: (a) a width that is narrower than the wedge slots 48 of the cutouts 42a, 42b, and 44; (b) a forward end 52 which is shorter than the wedge slot 48 to allow the forward end 52 to be inserted into the wedge slot 48; (c) a base or driving end portion 54 having a height which is greater than the height of the forward end 52 and is greater than the height of the wedge slot 48; (d) a straight upper edge 56 which extends from the base end portion 54 to the forward end 52; and (e) a lower angled edge 58 which diverges outwardly as it extends form the forward end 52 to the driving end portion 54 at an angle such that, as the forward end 52 of the rail wedge 50 is driven or pushed into the wedge slot 48, the resulting contact which occurs between the lower angled edge 58 of the rail wedge 50 and the bottom end 60 of the wedge slot 48 urges the upper edge 56 of the rail wedge 50 into binding contact with the bottom of the rail 5.

Because the lengths 55 of metal pipe or metal tubing used to form the continuous rails 5 of the inventive fence 2 are not welded together and are not welded to the upper post segments 8, the inventive method of constructing the inventive fence 2 allows, and preferably includes, the application of an attractive and protective powder coating, or other treatment or finish, to the lengths 55 of pipe or tubing prior to delivering the lengths 55 of pipe or tubing to the construction site.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed:
1. A fence comprising:
a plurality of upwardly extending lower post segments formed of metal pipe, the lower post segments being installed in the ground and the lower post segments having upper end portions;
a plurality of upwardly extending upper post segments formed of metal pipe, the upper post segments having lower end portions and the lower end portions having side walls;
the upper end portions of the lower post segments being received in the lower end portions of the upper post segments;
the lower end portions of the upper post segments having one or more welding openings provided through the side walls of the lower end portions for welding the lower end portions of the upper post segments to the upper end portions of the lower post segments; and
the lower end portions of the upper post segments further comprising
elongate slot openings which are provided through and extend in a tangential direction across the side walls of the lower end portions of the upper post segments such that the elongate slot openings are perpendicular to the upper post segments and
eyelet structures which project from the lower end portions of the upper post segments, the eyelet structures being positioned over and laterally across the elongate slot openings of the lower end portions of the upper post segments such that the eyelet structures are perpendicular to the elongate slot openings, the eyelet structures having openings therethrough which are positioned over and are in communication with the elongate slot openings.

2. The fence of claim 1 wherein the lower end portions of the upper post segments are welded to the upper end portions of the lower post segments through the one or more welding openings provided through the side walls of the lower end portions of the upper post segments.

3. The fence of claim 1 further comprising wedge pieces inserted into the openings of the eyelet structures of some or all of the upper post segments such that the wedge pieces are perpendicular to the upper post segments and are urged (i) into the elongate slot openings of the lower end portions of the upper post segments and (ii) tangentially against the upper end portions of the lower post segments so that the lower end portions of the upper post segments are at least temporarily locked on the upper end portions of the lower post segments by the wedge pieces.

4. The fence of claim 1 further comprising a connected series of lengths of metal pipe or metal tubing wherein the connected series of lengths of metal pipe or metal tubing extends continuously through rail openings formed through a series of the upper post segments, each adjacent pair of the lengths of metal pipe or metal tubing being connected together by a single pin joint which is inserted into each of the adjacent ends of the adjacent pair of the lengths of metal pipe or metal tubing.

5. The fence of claim 4 wherein the lengths of metal pipe or metal tubing forming the connected series of lengths of metal pipe or metal tubing are connected together without welding.

6. The fence of claim 4 further comprising:
slots formed in the upper post segments which extend from and are in communication with the rail openings and
wedge pieces inserted into the slots of the series of the upper post segments and into contact with the connected series of lengths of metal pipe or metal tubing so that the wedge pieces lock the connected series of lengths of metal pipe or metal tubing in fixed position in the rail openings of the series of upper post segments.

7. A fence comprising:
a plurality of upwardly extending lower post segments formed of metal pipe, the lower post segments being installed in the ground and the lower post segments having upper end portions;
a plurality of upwardly extending upper post segments formed of metal pipe, the upper post segments having lower end portions and the lower end portions having side walls;
the upper end portions of the lower post segments being received in the lower end portions of the upper post segments;
elongate slot openings which are provided through and extend in a tangential direction across the side walls of the lower end portions of the upper post segments such that the elongate slot openings are perpendicular to the upper post segments; and
eyelet structures which project from the lower end portions of the upper post segments, the eyelet structures being positioned over and laterally across the elongate slot openings of the lower end portions of the upper post segments such that the eyelet structures are perpendicular to the elongate slot openings, the eyelet structures having openings therethrough which are positioned over and are in communication with the elongate slot openings.

8. The fence of claim 7 further comprising wedge pieces inserted into the openings of the eyelet structures of some or all of the upper post segments such that the wedge pieces are perpendicular to the upper post segments and are urged (i) into the elongate slot openings of the lower end portions of the upper post segments and (ii) tangentially against the upper end portions of the lower post segments so that the lower end portions of the upper post segments are at least temporarily locked on the upper end portions of the lower post segments by the wedge pieces.

9. The fence of claim 7 wherein the lower end portions of the upper post segments are welded to the upper end portions of the lower post segments through one or more openings provided through the side walls of the lower end portions of the upper post segments.

10. The fence of claim 7 further comprising a connected series of lengths of metal pipe or metal tubing wherein the connected series of lengths of metal pipe or metal tubing extends continuously through rail openings formed through a series of the upper post segments, each adjacent pair of the lengths of metal pipe or metal tubing being connected together by a single pin joint which is inserted into each of the adjacent ends of the adjacent pair of the lengths of metal pipe or metal tubing.

11. The fence of claim 10 wherein the lengths of metal pipe or metal tubing forming the connected series of lengths of metal pipe or metal tubing are connected together without welding.

12. The fence of claim 10 further comprising:
slots formed in the upper post segments which extend from and are in communication with the rail openings and
wedge pieces inserted into the slots of the series of the upper post segments and into contact with the connected series of lengths of metal pipe or metal tubing so that the wedge pieces lock the connected series of lengths of metal pipe or metal tubing in fixed position in the rail openings of the series of upper post segments.

13. The fence of claim 7 wherein:
each of the eyelet structures comprises a first projecting attachment tab and a second projecting attachment tab;
the opening of each of the eyelet structures is positioned between the first projecting attachment tab of the eyelet structure and the second projecting attachment tab of the eyelet structure;
the first projecting attachment tab of each of the eyelet structures is received in a first tab opening in the side wall of the lower end portion of the upper post segment, the first tab opening being located above the elongate slot opening of the lower end portion of the upper post segment; and
the second projecting attachment tab of each of the eyelet structures is received in a second tab opening in the side wall of the lower end portion of the upper post segment, the second tab opening being located below the elongate slot opening of the lower end portion of the upper post segment.

14. The fence of claim 1 comprising the upper end portions of the lower post segments being above a surface of the ground.

15. The fence of claim 7 comprising the upper end portions of the lower post segments being above a surface of the ground.

* * * * *